(12) United States Patent
Wang et al.

(10) Patent No.: US 12,022,088 B2
(45) Date of Patent: Jun. 25, 2024

(54) METHOD AND APPARATUS FOR CONSTRUCTING MOTION INFORMATION LIST IN VIDEO ENCODING AND DECODING AND DEVICE

(71) Applicant: TENCENT TECHNOLOGY (SHENZHEN) COMPANY LIMITED, Guangdong (CN)

(72) Inventors: Yingbin Wang, Shenzhen (CN); Xiaozhong Xu, Shenzhen (CN); Shan Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 253 days.

(21) Appl. No.: 17/576,304

(22) Filed: Jan. 14, 2022

(65) Prior Publication Data

US 2022/0141469 A1   May 5, 2022

Related U.S. Application Data

(63) Continuation of application No. PCT/CN2021/071294, filed on Jan. 12, 2021.

(30) Foreign Application Priority Data

Jan. 17, 2020 (CN) .......................... 202010054758.9

(51) Int. Cl.
*H04N 19/139* (2014.01)
*H04N 19/11* (2014.01)
(Continued)

(52) U.S. Cl.
CPC .......... *H04N 19/139* (2014.11); *H04N 19/11* (2014.11); *H04N 19/176* (2014.11); *H04N 19/43* (2014.11); *H04N 19/593* (2014.11)

(58) Field of Classification Search
CPC .... H04N 19/139; H04N 19/11; H04N 19/176; H04N 19/43; H04N 19/593; H04N 19/52;
(Continued)

(56) References Cited

U.S. PATENT DOCUMENTS

| | | | |
|---|---|---|---|
| 2012/0020410 A1* | 1/2012 | Chang | H04N 19/523 |
| | | | 375/E7.123 |
| 2020/0169745 A1* | 5/2020 | Han | H04N 19/513 |
| 2022/0116587 A1* | 4/2022 | Zhao | H04N 19/52 |

FOREIGN PATENT DOCUMENTS

| | | |
|---|---|---|
| CN | 109644272 A | 4/2019 |
| CN | 109819255 A | 5/2019 |
| CN | 110557645 A | 12/2019 |

OTHER PUBLICATIONS

Zhao et al., "CE4-related: Simplification to History Based Motion Vector Prediction", Joint Video Experts Team (JVET) of ITU-T SG 16 WP 3 and ISO/IEC JTC 1/SC 29/WG 11, JVET-L0309, 12th Meeting: Macao, CN, Oct. 3-12, 2018 (5 pages total).

(Continued)

*Primary Examiner* — Boubacar Abdou Tchoussou
(74) *Attorney, Agent, or Firm* — Sughrue Mion, PLLC (57) ABSTRACT

This application provides a method for constructing a motion information list in video encoding and decoding, an apparatus, and a device, relating to the field of video encoding and decoding technologies. The method includes: obtaining candidate motion information and a length of the motion information list; based on the length of the motion information list, determining target motion information to check for duplicates in the motion information list; checking the motion information list to for duplicates by comparing the target motion information with the motion information list; and updating the motion information list based on whether the motion information list has a duplicate of the target motion information.

20 Claims, 4 Drawing Sheets

(51) Int. Cl.
*H04N 19/176* (2014.01)
*H04N 19/43* (2014.01)
*H04N 19/593* (2014.01)

(58) Field of Classification Search
CPC .... H04N 19/14; H04N 19/137; H04N 19/503; H04N 19/513
See application file for complete search history.

(56) References Cited

OTHER PUBLICATIONS

Zhao et al., "CE4: Methods of Reducing Number of Pruning Checks of History Based Motion Vector Prediction (Test 4.1.1)", Joint Video Experts Team (JVET) of ITU-T SG 16 WP 3 and ISO/IEC JTC 1/SC 29/WG 11, JVET-M0124, 13th Meeting: Marrakech, MA, Jan. 9-18, 2019 (6 pages total).
Xu et al., "CE4-related: Constraint of Pruning in History-based Motion Vector Prediction", Joint Video Experts Team (JVET) of ITU-T SG 16 WP 3 and ISO/IEC JTC 1/SC 29/WG 11, JVET-L0448-v2, 12th Meeting: Macao, CN, Oct. 3-12, 2018 (4 pages total).
Zhang et al., "CE4-related: History-based Motion Vector Prediction", Joint Video Experts Team (JVET) of ITU-T SG 16 WP 3 and ISO/IEC JTC 1/SC 29/WG 11, JVET-K0104-v1, 11th Meeting: Ljubljana, SI, Jul. 10-18, 2018 (5 pages total).
Haitao Yang et al, "CE4: Summary report on inter prediction and motion vector coding", Joint Video Experts Team (JVET) of ITU-T SG 16 WP 3 and ISO/IEC JTC 1/SC 29/WG 11, JVET-M0024-v2, Jan. 9-18, 2019, 13th Meeting, Marrakech, MA.
Jianle Chen et al., "Algorithm description for Versatile Video Coding and Test Model 7 (VTM 7)", Joint Video Experts Team (JVET) of ITU-T SG 16 WP 3 and ISO/IEC JTC 1/SC 29/WG 11, JVET-P2002-vl, Oct. 1-11, 2019, 16th Meeting, Geneva, CH.
Extended European Search Report issued Nov. 11, 2022 in European Application No. 21740643.8.
International Search Report of PCT/CN2021/071294 dated Apr. 6, 2021 [PCT/ISA/210].
Written Opinion of PCT/CN2021/071294 dated Apr. 6, 2021 [PCT/ISA/237].

* cited by examiner

Current video frame

METHOD AND APPARATUS FOR CONSTRUCTING MOTION INFORMATION LIST IN VIDEO ENCODING AND DECODING AND DEVICE

CROSS REFERENCE TO RELATED APPLICATION(S)

This application is a continuation of International Application No. PCT/CN2021/071294, filed Jan. 12, 2021, that claims priority to Chinese Patent Application No. 202010054758.9, filed with the China National Intellectual Property Administration on Jan. 17, 2020, the disclosures of which are incorporated by reference in their entireties.

FIELD

Embodiments of this application relate to the field of video encoding and decoding technologies, and in particular, to a method and an apparatus for constructing a motion information list in video encoding and decoding and a device.

BACKGROUND

In the existing video compression technologies, for example, versatile video coding (VVC) and Audio Video coding Standard 3 (AVS3), video codecs usually need to construct a motion information list to export a predicted value of a BV in an intra block copy (IBC) mode.

In a process of constructing the motion information list in the IBC mode, before a piece of candidate motion information is inserted into the motion information list, it is necessary to check whether the motion information list includes a piece of motion information that is duplicated with the candidate motion information, to avoid inserting repeated motion information into the motion information list. When the motion information list already includes M pieces of motion information, at most M times of duplicate checking are required to determine whether to insert the candidate motion information, where M is a positive integer. If N pieces of motion information are used for constructing the motion information list, a total of [N×(N−1)]/2 duplicate checking operations are required, where N is a positive integer.

Because of the size of the motion information list, too many duplicate checking operations increase the complexity of the video codecs and increase the computational strain while encoding or decoding the video codecs.

SUMMARY

Embodiments of the present disclosure provide a method and an apparatus for constructing a motion information list in video encoding and decoding and a device, to decrease a quantity of duplicate checking operations, thereby reducing the complexity of a video codec. The technical solutions are as follows:

According to an aspect, an embodiment of the present disclosure provides a method for constructing a motion information list in video encoding and decoding, applicable to an encoder side device or a decoder side device, including:

obtaining candidate motion information and a length of a motion information list, the length of the motion information list being represented by a quantity of pieces of motion information included in the motion information list;

determining, according to the length of the motion information list, target motion information in the motion information list that needs to be compared with the candidate motion information to check for duplicates;

performing duplicate-checking comparison between the candidate motion information and the target motion information; and updating the motion information list according to a result of the duplicate-checking comparison.

According to another aspect, an embodiment of the present disclosure provides an apparatus for constructing a motion information list in video encoding and decoding, the apparatus including: at least one memory configured to store program code; and at least one processor configured to read the program code and operate as instructed by the program code, the program code including:

information obtaining code configured to cause the at least one processor to obtain candidate motion information and a length of a motion information list, the length of the motion information list being represented by a quantity of pieces of motion information included in the motion information list;

information determining code configured to cause the at least one processor to determine, according to the length of the motion information list, target motion information in the motion information list that needs to be compared with the candidate motion information to check for duplicates;

duplicate checking code configured to cause the at least one processor to perform duplicate-checking comparison between the candidate motion information and the target motion information; and list updating code configured to cause the at least one processor to update the motion information list according to a result of the duplicate-checking comparison.

An embodiment of the present disclosure provides a computer device, including a processor and a memory, the memory storing at least one instruction, at least one program, a code set, or an instruction set, the at least one instruction, the at least one program, the code set, or the instruction set being loaded and executed by the processor to implement the method for constructing a motion information list in video encoding and decoding described above.

Another embodiment of the present disclosure provides a non-transitory computer-readable storage medium, the computer-readable storage medium storing at least one program, the at least one program configured to cause at least one processor to perform the method for constructing a motion information list in video encoding and decoding described above.

An embodiment of the present disclosure provides a computer program product, the computer program product, when executed by a processor, being configured to implement the method for constructing a motion information list in video encoding and decoding described above.

The technical solutions provided in the embodiments of the present disclosure may include the following beneficial effects:

Target motion information in a motion information list that needs to be compared with to-be-inserted candidate motion information for duplicate checking is determined by obtaining a length of the motion information list. Duplicate-checking comparison is performed between the candidate motion information and the target motion information, so that some pieces of motion information from the motion information list are selectively compared instead of performing complete duplicate-checking comparison on all pieces of motion information in the motion information list every time. Thus, selective comparison helps decrease the number of duplicate checking operations performed, consequently reducing the complexity of a video codec and improving efficiency and speed of encoding or decoding the video codec.

DETAILED DESCRIPTION

To make the objectives, technical solutions, and advantages of the present disclosure clearer, the following further describes implementations of the present disclosure in detail with reference to the accompanying drawings.

Figure 1:
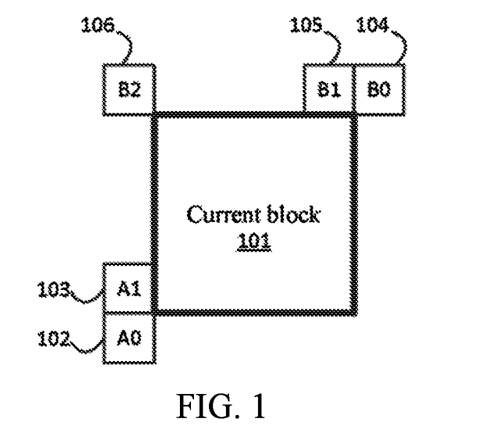
FIG. 1 is an exemplary schematic diagram of a type of video encoding according to the present disclosure.

Referring to FIG. 1, a current block 101 includes a sample that has been discovered by an encoder in a motion search process. The sample can be predicted based on a previous block of the same size that have been spatially offset. In addition, a motion vector (MV) may be derived from metadata associated with one or more reference images instead of being directly encoded. For example, the MV is derived from metadata of a nearest reference image (in decoding order) using an MV associated with any one of five surrounding samples A0, A1, B0, B1, and B2 (respectively corresponding to 102 to 106).

Figure 2:
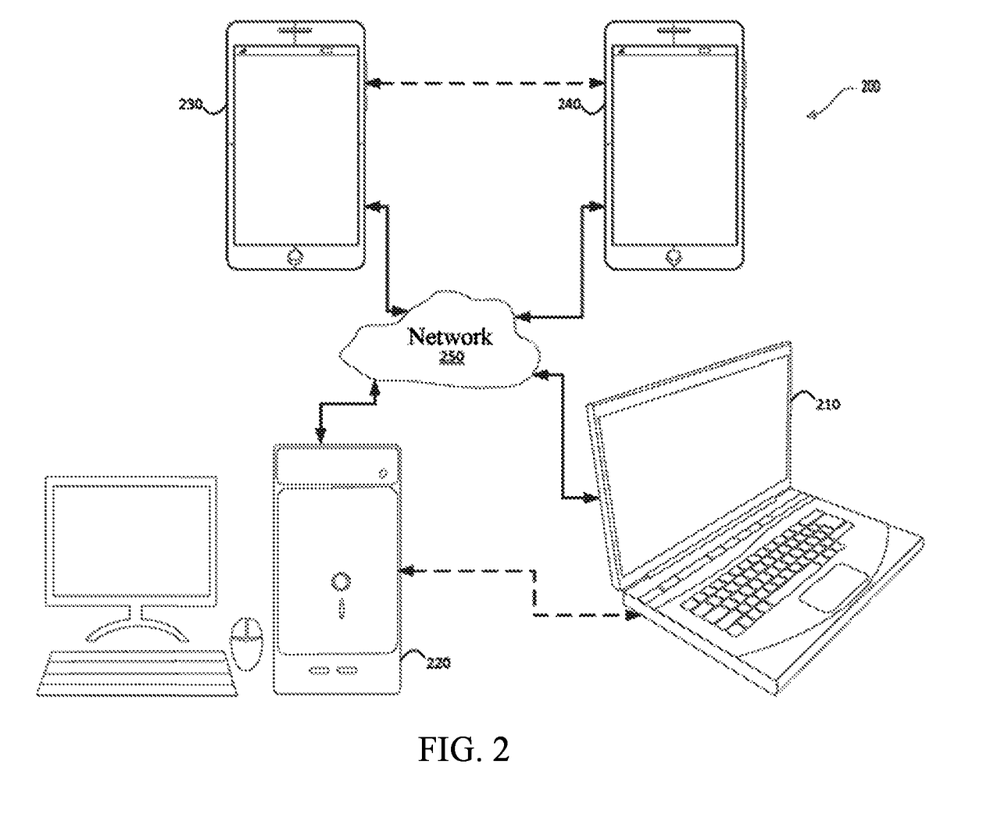
FIG. 2 is a simplified block diagram of a communication system according to an embodiment of the present disclosure.

FIG. 2 is a simplified block diagram of a communication system according to an embodiment of the present disclosure. A communication system 200 includes a plurality of devices. The devices can communicate with each other through, for example, a network 250. For example, the communication system 200 includes a first device 210 and a second device 220 connected to each other by the network 250. In the embodiment of FIG. 2, the first device 210 and the second device 220 perform one-way data transmission. For example, the first device 210 may encode video data, such as a video image stream acquired by the first device 210, to transmit the encoded video data to the second device 220 through the network 250. The encoded video data is transmitted in a form of one or more encoded video streams. The second device 220 may receive the encoded video data from the network 250, decode the encoded video data to restore the video data, and display the video image according to the restored video data. One-way data transmission is relatively common in applications such as a media service.

In another embodiment, a communication system 200 includes a third device 230 and a fourth device 240 that perform two-way transmission of encoded video data, where the two-way transmission may occur, for example, during a video conference. For two-way data transmission, either of the third device 230 and the fourth device 240 may encode video data (for example, a video image stream acquired by a device), to transmit the encoded video data to the other of the third device 230 and the fourth device 240 through a network 250. Either of the third device 230 and the fourth device 240 may further receive encoded video data transmitted by the other of the third device 230 and the fourth device 240, decode the encoded video data to restore the video data, and display the video image on an accessible display apparatus according to the restored video data.

In the embodiment of FIG. 2, the first device 210, the second device 220, the third device 230, and the fourth device 240 may be computer devices such as servers, personal computers (PCs), and smart phones, but the principle disclosed in the present disclosure is not limited thereto. The embodiments of the present disclosure are applicable to a PC, a mobile phone, a tablet computer, a media player, and/or a dedicated video conferencing device. The network 250 represents any quantity of networks that transmit encoded video data between the first device 210, the second device 220, the third device 230, and the fourth device 240 and includes, for example, wired and/or wireless communication networks. The communication network 250 may exchange data in circuit-switched and/or packet-switched channels. The network may include a telecommunication network, a local area network, a wide area network, and/or the Internet. For the objectives of the present disclosure, unless explained below, an architecture and a topology of the network 250 may be insignificant to an operation disclosed in the present disclosure.

Figure 3:
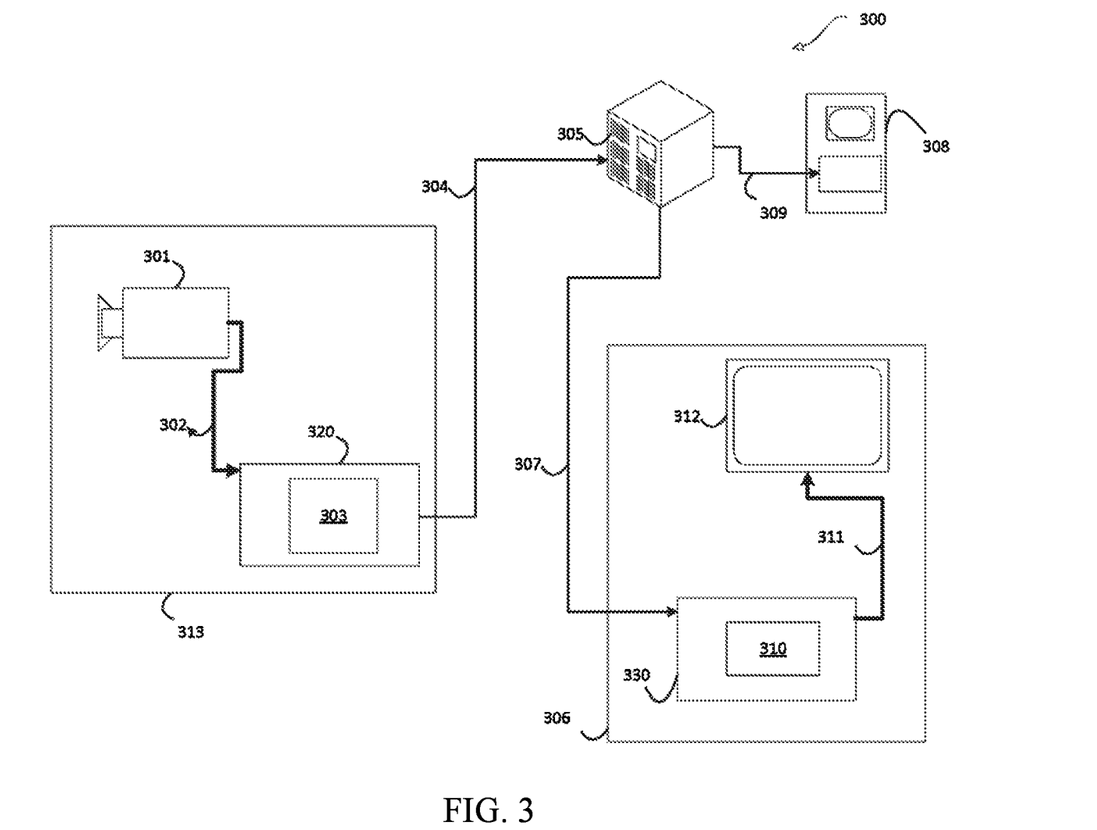
FIG. 3 is an exemplary schematic diagram of a placement mode of a video encoder and a video decoder in a streaming environment according to the present disclosure.

According to an embodiment, FIG. 3 shows a placement mode of a video encoder and a video decoder in a streaming environment. The subject matter disclosed in the present disclosure is equally applicable to other video-supporting applications including, for example, video conferencing, a digital television (TV), and storing a compressed video on digital mediums including a compact disc (CD), a digital versatile disc (DVD), a memory stick, and the like.

A streaming system may include an acquisition subsystem 313. The acquisition subsystem may include a video source 301 such as a digital camera. The video source creates an uncompressed video image stream 302. In the embodiments, the video image stream 302 includes a sample taken by a digital camera. Compared with the encoded video data 304 (or an encoded video stream), the video image stream 302 is depicted as a thick line to emphasize the video image stream with a large data volume. The video image stream 302 may be processed by an electronic device 320. The electronic device 320 includes a video encoder 303 coupled to the video source 301. The video encoder 303 may include hardware, software, or a combination of software and hardware to implement or perform aspects of the disclosed subject matter as described in more detail below. Compared with the video image stream 302, the encoded video data 304 (or the encoded video stream 304) is depicted as thin lines to emphasize the encoded video data 304 (or the encoded video stream 304) with a smaller data volume, and may be stored on a streaming server 305 for future use. One or more streaming client subsystems, such as a client subsystem 306 and a client subsystem 308 in FIG. 3, can access the streaming server 305 to retrieve a copy 307 and a copy 309 of the encoded video data 304. The client subsystem 306 may include, for example, a video decoder 310 in an electronic device 330. The video decoder 310 decodes the incoming copy 307 of the encoded video data and generates an output video image stream 311 that may be displayed on a display 312 (for example, a display screen) or another display device (not depicted). In some streaming systems, the encoded video data 304, the video data 307, and the video data 309 (for example, a video bitstream) may be encoded according to some video encoding/compression standards.

The electronic device 320 and the electronic device 330 may include other components (not shown). For example, the electronic device 320 may include a video decoder (not shown), and the electronic device 330 may further include a video encoder (not shown). The video decoder is configured to decode received encoded video data, and the video encoder is configured to encode video data.

Figure 4:
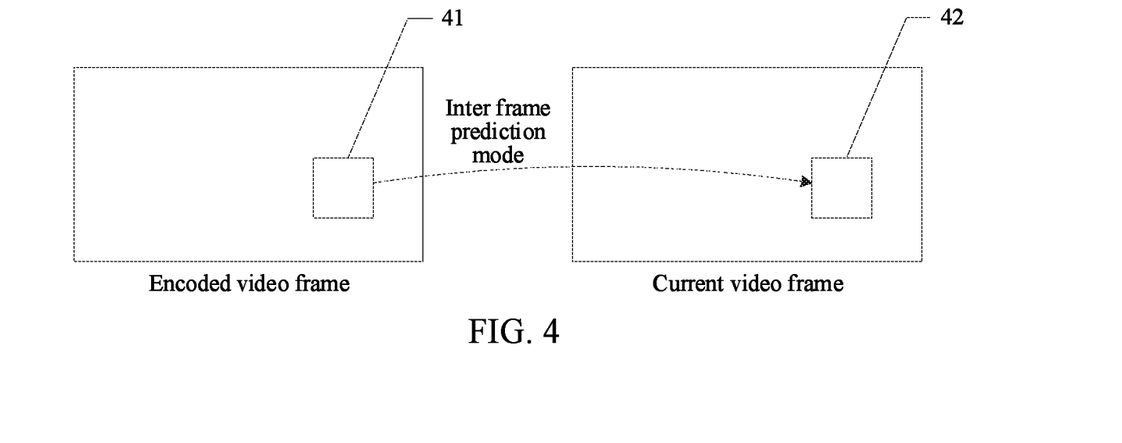
FIG. 4 is a schematic diagram of encoding in an inter frame prediction mode according to an embodiment of the present disclosure.
Figure 5:
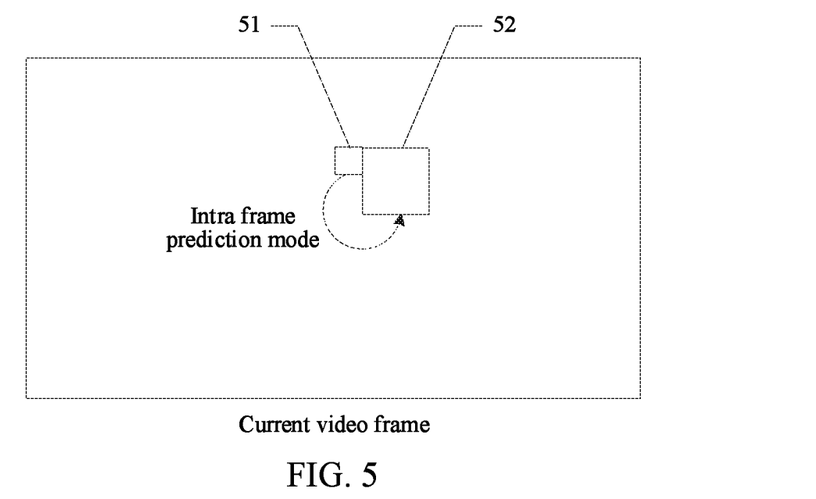
FIG. 5 is a schematic diagram of encoding in an intra frame prediction mode according to an embodiment of the present disclosure.

When a to-be-encoded block in a video frame is being encoded, an inter frame prediction mode or an intra frame prediction mode can be used for generating a prediction block based on one or more encoded reference blocks. The prediction block may be a predicted version of the to-be-encoded block. A residual block may be generated by subtracting the to-be-encoded block from the prediction block, and vice versa, the residual block may be used for representing a prediction residual (or referred to as a prediction error). Since an amount of data required for representing the prediction residual may generally be less than an amount of data required for representing the to-be-encoded block, the residual block can be encoded to achieve a higher compression ratio. For example, as shown in FIG. 4, for the inter frame prediction mode, an encoded reference block 41 and a to-be-encoded block 42 are present in two different images (that is, video frames). As shown in FIG. 5, for the intra frame prediction mode, an encoded reference block 51 and a to-be-encoded block 52 are present in a same image (that is, a video frame).

Video encoding methods include inter-frame coding and intra-frame coding. Inter-frame coding refers to encoding a code unit or an image using inter frame prediction. Intra-frame coding refers to encoding a code unit using intra frame prediction. The code unit encoded through normal intra frame prediction is referred to as a normal intra code unit, and the code unit encoded in the IBC mode is referred to as a block copy intra frame code unit.

Inter frame prediction refers to a process of using a previously decoded image to generate a predicted value of a current image sample. Intra frame prediction refers to a process of using a previously decoded sample to generate a predicted value of a current sample in a same decoded image. Intra frame prediction is divided into normal intra frame prediction and IBC (also referred to block copy intra frame prediction).

A block vector (BV) refers to a two-dimensional vector used in the IBC mode. A value of the BV is coordinate offsets between a current block and a reference block, where both the current block and the reference block are in a current image. In the IBC mode, BV prediction can be introduced. A BV of a current block is predicted to obtain a predicted BV corresponding to the current block, and a difference between the predicted BV corresponding to the current block and an actual BV is encoded and transmitted, which, compared with directly encoding and transmitting the actual BV corresponding to the current block, is beneficial to saving bit overheads. In the embodiments of the present disclosure, the BV prediction refers to obtaining a predicted value of a BV of a current block using the BV prediction technology.

A motion vector (MV) refers to a two-dimensional vector used for inter frame prediction, which points from a current image to a reference image. A value of the MV is coordinate offsets between the current block and a reference block, where the current block and the reference block are in two different images. In an inter frame prediction mode, MV prediction can be introduced. An MV of a current block is predicted to obtain a predicted MV corresponding to the current block, and a difference between the predicted MV corresponding to the current block and an actual MV is encoded and transmitted, which, compared with directly encoding and transmitting the actual MV corresponding to the current block, is beneficial to saving bit overheads. In the embodiments of the present disclosure, the MV prediction refers to obtaining a predicted value of an MV of a current block using the MV prediction technology.

In the embodiments of the present disclosure, the motion information list is a list used for recording motion information of encoded units. The motion information list may include a plurality of pieces of motion information, and each piece of motion information corresponds to a corresponding index value (index). If the technical solutions of the present disclosure are applied to the IBC mode, the motion information may include a BV, position information, size information, and repeat count information, and the like. If the technical solutions of the present disclosure are applied to the inter frame prediction mode, the motion information may include an MV, reference frame information, and the like. After obtaining predicted motion information corresponding to a current block (including a prediction vector, such as the predicted BV or the predicted MV described above) by constructing a motion information list, an encoder side obtains an index value of the predicted motion information corresponding to the current block by looking up the motion information list, and then encodes and transmits the index value. Correspondingly, after decoding the index value of the predicted motion information corresponding to the current block by constructing a motion information list, a decoder side can learn the predicted motion information corresponding to the current block by looking up the list.

In different scenarios, or with the evolution and development of technologies, the term "motion information list" may change. For example, in an IBC mode, the "motion information list" may also be referred to as "a candidate list (denoted as CbvpCandidateList)", or may also be referred to as a motion information index list, a predicted BV list, a BV index list, or the like. However, a person skilled in the art may understand the meaning of the list from its function, and a list name is not specifically limited in the embodiments of the present disclosure.

In a current IBC mode of AVS3, a category-based method for constructing a motion information list is adopted. An encoder side and a decoder side construct a motion information lists using a same method. The encoder side transmits an index value (index), and notifies, using the index value, the decoder side of which piece of motion information in the motion information list is selected. The decoder side selects the selected motion information, to obtain predicted motion information of a current block, where the predicted motion information includes a predicted value of a BV of the current block. The following uses the encoder side as an example to introduce a method for constructing a motion information list:

1. Store an IBC coded block that has been encoded into history-based BV prediction (HBVP) list in an encoding order, the HBVP list storing information such as BVs of historical IBC coded blocks, an appearance frequency, a width, and a height of the BV in HBVP, and an abscissa and an ordinate of an upper left corner of the coded block.

2. Classify the BV in the HBVP list into corresponding candidate BV categories according to the following attributes:

Category 0: A size (width×height) of the coded block is greater than or equal to a threshold (64 luminance pixels).

Category 1: An appearance frequency of the BV of the coded block in HBVP is greater than or equal to 2.

Category 2: Coordinates (upper left corner) of the coded block are on a left side of a current block.

Category 3: The coordinates (upper left corner) of the coded block are above the current block.

Category 4: The coordinates (upper left corner) of the coded block are at the upper left of the current block, Category 5: The coordinates (upper left corner) of the coded block are at the upper right of the current block.

Category 6: The coordinates (upper left corner) of the coded block are at the lower left of the current block.

3. In an order from category 0 to category 6, if a quantity of BVs belonging to the category is greater than 0, insert a BV with an encoding order closest to the current coded block in the category (denoted as a candidate BV) into a tail of the motion information list:

3-1. If the motion information list is empty, the candidate BV is directly inserted.

3-2. If the motion information list is not empty, it is necessary to check whether BVs in the motion information list are duplicate with the candidate By. If none of the BVs is duplicate with the candidate BV, the candidate BV is inserted; otherwise, the candidate BV is not inserted.

When the motion information list already includes M pieces of motion information, at most M times of duplicate checking are required to determine whether to insert the candidate motion information, where M is a positive integer. If N pieces of motion information are used for constructing the motion information list, a total of [N×(N−1)]/2 duplicate checking operations are required if, where N is a positive integer. Obviously, too many duplicate checking operations increase the complexity of the video codecs.

In the technical solutions provided in the embodiments of the present disclosure, target motion information in a motion information list that needs to be compared with to-be-inserted candidate motion information for duplicate checking is determined by obtaining a length of the motion information list. Duplicate-checking comparison is performed between the candidate motion information and the target motion information, so that some pieces of motion information are selectively selected from the motion information list for duplicate-checking comparison instead of performing complete duplicate-checking comparison on all pieces of motion information in the motion information list every time, which helps decrease a quantity of duplicate checking operations, thereby reducing the complexity of a video codec.

The technical solutions provided in the embodiments of the present disclosure can be applied to the H.266/VCC standard, the H.265/High Efficient Video Coding (HEVC)), the Audio Video coding Standard (AVS) (such as AVS3) or a next-generation video coding and decoding standard, which is not limited in this embodiment of the present disclosure.

Operations of a method for constructing a motion information list in video encoding and decoding provided in the embodiments of the present disclosure may be performed by a decoder side device or an encoder side device. During video decoding and video encoding, the technical solutions provided in the embodiments of the present disclosure can be used for constructing a motion information list. Both the decoder side device and the encoder side device can be a computer device. The computer device refers to an electronic device with data calculation, processing, and storage capabilities, such as a PC, a mobile phone, a tablet computer, a media player, a dedicated video conferencing device, or a server.

In addition, the method provided in the present disclosure can be used alone or in combination with other methods in any order. The encoder and decoder based on the method provided in the present disclosure can be implemented by one or more processors or one or more integrated circuits. The technical solutions of the present disclosure are described by using embodiments.

Figure 6:
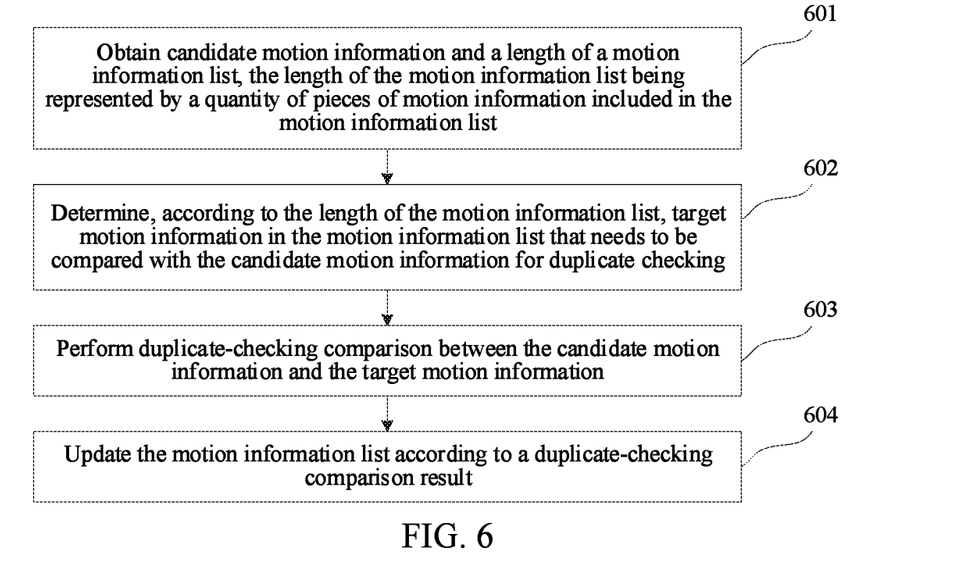
FIG. 6 is a flowchart of a method for constructing a motion information list in video encoding and decoding according to an embodiment of the present disclosure.

FIG. 6 is a flowchart of a method for constructing a motion information list in video encoding and decoding according to an embodiment of the present disclosure. For ease of description, descriptions are provided merely based on that the operations are performed by a computer device. The method may include the following operations (601 to 604):

Operation 601: Obtain candidate motion information and a length of a motion information list, the length of the motion information list being represented by a quantity of pieces of motion information included in the motion information list.

The candidate motion information refers to a piece of motion information to be inserted into the motion information list. A method of obtaining the candidate motion information is not limited in the embodiments of the present disclosure. For example, in an IBC mode, the candidate motion information, that is, the candidate BV described above, can be determined in the above-mentioned category-based manner.

The motion information list is a list used for recording and indexing motion information. In the embodiments of the present disclosure, the motion information refers to a predicted value of a vector of a current block obtained by predicting the vector of the current block based on a vector prediction technology. The above-mentioned "vector" is a two-dimensional vector used for representing motion information, for example, the BV or the MV described above. Exemplarily, the motion information list may be a motion information list in the IBC mode, or may be a motion information list in an inter frame prediction mode. Reference may be made to the above-mentioned text for descriptions about the motion information list. Details are not described herein again.

A length of the motion information list refers to a quantity of pieces of motion information currently included in the motion information list, that is, a real-time length of the motion information list at the moment when operation 601 is performed. As the motion information is added to or removed from in the motion information list, the length of the motion information list also changes accordingly. For example, if one piece of motion information is inserted into the motion information list, the length of the motion information list is increased by 1; if one piece of motion information is removed from the motion information list, the length of the motion information list is decreased by 1.

Operation 602: Determine, according to the length of the motion information list, target motion information in the motion information list that needs to be compared with the candidate motion information for duplicate checking.

The target motion information may include one or more pieces of motion information. The target motion information may include all pieces of motion information in the motion information list, or may include some pieces of motion information in the motion information list.

In the embodiments of the present disclosure, not all pieces of motion information in the motion information list are compared with the candidate motion information for duplicate checking, and which piece or pieces of motion information are selected from the motion information list for duplicate-checking comparison with the candidate motion information are determined according to the length of the motion information list, so that some pieces of motion information are selectively selected from the motion information list for duplicate-checking comparison instead of performing complete duplicate-checking comparison on all pieces of motion information in the motion information list every time, which helps decrease a quantity of duplicate checking operations, thereby reducing the complexity of a video codec.

In an exemplary embodiment, a threshold is set, the length of the motion information list is compared with the above-mentioned threshold, and which piece or pieces of motion information are selected from the motion information list for duplicate-checking comparison with the candidate motion information are determined according to a magnitude relationship between the two. Reference may be made to descriptions in the following embodiments for details.

Operation 603: Perform duplicate-checking comparison between the candidate motion information and the target motion information.

After the target motion information is determined, duplicate-checking comparison is performed between the candidate motion information and the target motion information. As an example, duplicate-checking comparison is performed between the candidate motion information and the target motion information one by one sequentially. When it is found that the candidate motion information is duplicate with a specific piece of target motion information, comparison can be stopped, and it is determined that a duplicate-checking comparison result is that there is duplication. When it is found that the candidate motion information is not duplicate with a specific piece of target motion information, a next piece of target motion information is selected for duplicate-checking comparison with the candidate motion information. If duplicate-checking comparison is performed on all pieces of target motion information, and none of the pieces of target motion information is duplicate with the candidate motion information, it is determined that the duplicate-checking comparison result is that there is no duplication.

In addition to the vector value (such as the BV corresponding to the IBC mode and the MV corresponding to the inter frame prediction mode), the motion information further includes other information. For example, in the IBC mode, the motion information further includes position information, size information, repeat count information, and the like. In the inter frame prediction mode, the motion information further includes reference frame information and the like. When duplicate-checking comparison is performed between two pieces of motion information, duplicate-checking comparison is performed between only vector values included in the two pieces of motion information.

In an embodiment, that the candidate motion information is duplicate with a specific piece of motion information in the motion information list means that both an abscissa and an ordinate of the vector value included in the candidate motion information are equal to those of a vector value included in the motion information. In the embodiments of the present disclosure, the vector value included in the candidate motion information and the vector value included in the motion information can both be represented by two-dimensional coordinates. If the two-dimensional coordinates of the vector value included in the candidate motion information are represented as $(x_0, y_0)$, and the two-dimensional coordinates of the vector value included in the motion information are represented as $(x_1, y_1)$, when $x_0=x_1$ and $y_0=y_1$, it is determined that the candidate motion information is duplicate with the motion information; otherwise, it is determined that the candidate motion information is not duplicate with the motion information.

In another embodiment, that the candidate motion information is duplicate with a specific piece of motion information in the motion information list means that both an absolute value of an abscissa difference and an absolute value of an ordinate difference between a vector value included in the candidate motion information and a vector value included in the motion information are smaller than preset thresholds. In the embodiments of the present disclosure, the vector value included in the candidate motion information and the vector value included in the motion information can both be represented by two-dimensional coordinates. If the two-dimensional coordinates of the vector value included in the candidate motion information are represented as $(x_0, y_0)$, and the two-dimensional coordinates of the vector value included in the motion information are represented as $(x_1, y_1)$, when $|x_0-x_1|<a$ and $|y_0-y_1|<b$, it is determined that the candidate motion information is duplicate with the motion information; otherwise, it is determined that the candidate motion information is not duplicate with the motion information. $|x_0-x_1|$ represents the absolute value of the abscissa difference between the vector value included in the candidate motion information and the vector value included in the motion information, $|y_0-y_1|$ represents the absolute value of the ordinate difference between the vector value included in the candidate motion information and the vector value included in the motion information, a and b are preset thresholds, and a and b may be equal or not.

For the IBC mode, when duplicate-checking comparison is performed on the motion information, only the BV needs to be compared for duplicate-checking. For the inter frame prediction mode, since the one-way prediction mode is used for P frames, and the two-way prediction mode is used for B frames, the motion information may include information such as an index of a forward reference frame, a forward MV, an index of a backward reference frame, and a backward MV. The one-way prediction mode only includes the index of the forward reference frame and the forward MV, and does not include the index of the backward reference frame and the backward MV. Therefore, during duplicate-checking comparison, duplicate-checking comparison is first performed on a forward reference vector. If the forward reference vector is duplicate, it is determined a duplicate-checking comparison result is that there is duplication. If the forward reference vector is not duplicate, whether there is a backward reference vector is checked. If there is no backward reference vector, it is determined that the duplicate-checking comparison result is that there is no duplication. If there is a backward reference vector, duplicate-checking comparison is performed on the backward reference vector.

If the backward reference vector is duplicate, it is determined that the duplicate-checking comparison result is that there is duplication. If the backward reference vector is not duplicate, it is determined that the duplicate-checking comparison result is that there is no duplication.

Operation 604: Update the motion information list according to a duplicate-checking comparison result.

After the duplicate-checking comparison result is obtained, whether to insert the candidate motion information into the motion information list is further decided. For example, if the duplicate-checking comparison result is that there is duplication, it can be decided not to insert the candidate motion information into the motion information list. If the duplicate-checking comparison result is that there is no duplication, it can be decided to insert the candidate motion information into the motion information list.

In an exemplary embodiment, operation 604 may include the following example sub-operations:

1. Insert the candidate motion information into the motion information list when the duplicate-checking comparison result is that there is no duplication, and the length of the motion information list is less than a maximum length.

The maximum length refers to a maximum quantity of pieces of motion information that can be included in the motion information list. If a length of the motion information list is less than the maximum length, it indicates that the motion information list is still not full, and motion information can still be inserted into the motion information list. Therefore, the candidate motion information can be inserted into the motion information list.

2. Perform 2.1 or 2.2 below if the duplicate-checking comparison result is that there is no duplication, and the length of the motion information list is equal to the maximum length:

2.1. End construction of the motion information list and skip inserting the candidate motion information into the motion information list.

2.2. Remove the motion information first inserted into the motion information list according to the first-in, first-out principle and insert the candidate motion information into the motion information list.

If the length of the motion information list is less than the maximum length, it indicates that the motion information list is still not full. In some implementation, the construction of the motion information list may be ended, and the candidate motion information is not inserted into the motion information list, which helps simplify a processing procedure of a codec and save processing overheads. In another implementation, the motion information first inserted into the motion information list may be removed, and the candidate motion information may be inserted into the motion information list, thereby updating the motion information list.

3. Perform 3.1 or 3.2 below if the duplicate-checking comparison result is that there is duplication:

3.1. Skip inserting the candidate motion information into the motion information list.

3.2. Remove the motion information duplicate with the candidate motion information from the motion information list, and insert the candidate motion information into the motion information list.

If the duplicate-checking comparison result is that there is duplication, in an example implementation, the candidate motion information is not inserted into the motion information list, which helps simplify a processing procedure of a codec and save processing overheads. In another implementation, the motion information duplicate with the candidate motion information may be removed from the motion information list, and the candidate motion information is inserted into the motion information list, thereby updating the motion information list.

In addition, the inserting the candidate motion information into the motion information list may include the following implementations: first, inserting the candidate motion information into a tail of the motion information list; and second, inserting the candidate motion information into a head of the motion information list. A specific implementation adopted can be designed with reference to actual conditions, which is not limited in the embodiments of the present disclosure.

In summary, in the technical solutions provided in the embodiments of the present disclosure, target motion information in a motion information list that needs to be compared with to-be-inserted candidate motion information for duplicate checking is determined by obtaining a length of the motion information list. Duplicate-checking comparison is performed between the candidate motion information and the target motion information, so that some pieces of motion information are selectively selected from the motion information list for duplicate-checking comparison instead of performing complete duplicate-checking comparison on all pieces of motion information in the motion information list every time, which helps decrease a quantity of duplicate checking operations, thereby reducing the complexity of a video codec.

In the embodiments of the present disclosure, the following example implementations are provided, to determine, according to the length of the motion information list, the target motion information in the motion information list that is compared with the candidate motion information for duplicate checking.

In an example implementation, when a length N of the motion information list is less than or equal to a first threshold $T_1$, it is determined that the target motion information includes all N pieces of motion information in the motion information list; and when the length N of the motion information list is greater than the first threshold $T_1$, it is determined that the target motion information includes $T_1$ pieces of motion information in the motion information list.

That is, when a quantity of pieces of motion information currently included in the motion information list is less than or equal to the first threshold $T_1$, indicating that the quantity of pieces of motion information currently included in the motion information list is small, it is determined that the target motion information includes all N pieces of motion information the motion information list, that is, duplicate-checking comparison is performed between the candidate motion information and all N pieces of motion information in the motion information list; and when the quantity of pieces of motion information currently included in the motion information list is greater than the first threshold $T_1$, indicating that the quantity of pieces of motion information currently included in the motion information list is large, it is determined that the target motion information includes $T_1$ pieces of motion information in the motion information list, that is, duplicate-checking comparison is performed between the candidate motion information and some pieces of motion information in the motion information list, so as to decrease a quantity of duplicate checking operations, thereby reducing the complexity of a video codec.

The above-mentioned first threshold $T_1$ may be set with reference to a maximum length of the motion information list, or the first threshold $T_1$ may be predefined in a protocol, which is not limited in the embodiments of the present disclosure. The first threshold $T_1$ is less than the maximum length of the motion information list. In addition, when the target motion information includes $T_1$ pieces of motion information in the motion information list, the $T_1$ pieces of motion information may be $T_1$ pieces of motion information in a head of the motion information list, or $T_1$ pieces of motion information in a tail of the motion information list, or $T_1$ pieces of motion information selected from the motion information list according to other predefined rules, which is not limited in the embodiments of the present disclosure.

In another implementation, when a length N of the motion information list is less than or equal to a second threshold $T_2$, it is determined that the target motion information includes all N pieces of motion information in the motion information list, and when the length N of the motion information list is greater than the second threshold $T_2$, duplicate-checking comparison is skipped, and it is determined that a duplicate-checking result is that there is no duplication.

That is, when a quantity of pieces of motion information currently included in the motion information list is less than or equal to the second threshold $T_2$, indicating that the quantity of pieces of motion information currently included in the motion information list is small, it is determined that the target motion information includes all N pieces of motion information the motion information list, that is, duplicate-checking comparison is performed between the candidate motion information and all N pieces of motion information in the motion information list. When the quantity of pieces of motion information currently included in the motion information list is greater than the second threshold $T_2$, indicating that the quantity of pieces of motion information currently included in the motion information list is large, duplicate-checking comparison can be skipped, and it is directly determined that the duplicate-checking comparison result is that there is no duplication, or it is directly determined that the duplicate-checking comparison result is that there is duplication, which can further decrease a quantity of duplicate checking operations, thereby reducing the complexity of a video codec. In addition, when duplicate-checking comparison is skipped, whether to directly determine the duplicate-checking comparison result is that there is no duplication or directly determine the duplicate-checking comparison result is that there is duplication can be predefined in a protocol, which is not limited in the embodiments of the present disclosure.

The above-mentioned second threshold $T_2$ may be set with reference to a maximum length of the motion information list, or the second threshold $T_2$ may be predefined in a protocol, which is not limited in the embodiments of the present disclosure. The second threshold $T_2$ is less than the maximum length of the motion information list.

In another implementation, when a length N of the motion information list is less than or equal to the first threshold $T_1$, it is determined that the target motion information includes all N pieces of motion information in the motion information list; when the length N of the motion information list is greater than the first threshold $T_1$ and is less than or equal to the second threshold $T_2$, it is determined that the target motion information includes $T_1$ pieces of motion information in the motion information list; and when the length N of the motion information list is greater than the second threshold $T_2$, duplicate-checking comparison is skipped, and it is determined that the duplicate-checking comparison result is that there is no duplication, the first threshold $T_1$ being less than the second threshold $T_2$.

That is, when a quantity of pieces of motion information currently included in the motion information list is less than or equal to the first threshold $T_1$, indicating that the quantity of pieces of motion information currently included in the motion information list is small, it is determined that the target motion information includes all N pieces of motion information the motion information list, that is, duplicate-checking comparison is performed between the candidate motion information and all N pieces of motion information in the motion information list. When the quantity of pieces of motion information currently included in the motion information list is greater than the first threshold $T_1$ and is less than or equal to the second threshold $T_2$, indicating that the quantity of pieces of motion information currently included in the motion information list is large, it is determined that the target motion information includes $T_1$ pieces of motion information in the motion information list, that is, duplicate-checking comparison is performed between the candidate motion information and some pieces of the motion information in the motion information list, to decrease a quantity of duplicate checking operations, thereby reducing the complexity of a video codec. When the quantity of pieces of motion information currently included in the motion information list is greater than the second threshold $T_2$, indicating that the quantity of pieces of motion information currently included in the motion information list is very large, duplicate-checking comparison can be skipped, and it is directly determined that the duplicate-checking comparison result is that there is duplication, or it is directly determined that the duplicate-checking comparison result is that there is no duplication, or it is directly determined that the duplicate-checking comparison result is that there is duplication, which can further decrease a quantity of duplicate checking operations, thereby reducing the complexity of a video codec. In addition, when duplicate-checking comparison is skipped, whether to directly determine the duplicate-checking comparison result is that there is no duplication or directly determine the duplicate-checking comparison result is that there is duplication can be predefined in a protocol, which is not limited in the embodiments of the present disclosure.

The above-mentioned first threshold $T_1$ and the second threshold $T_2$ may be set with reference to a maximum length of the motion information list, or the first threshold $T_1$ and the second threshold $T_2$ may be predefined in a protocol, which is not limited in the embodiments of the present disclosure. The first threshold $T_1$ and the second threshold $T_2$ are both less than the maximum length of the motion information list. In addition, when the target motion information includes $T_1$ pieces of motion information in the motion information list, the $T_1$ pieces of motion information may be $T_1$ pieces of motion information in a head of the motion information list, or $T_1$ pieces of motion information in a tail of the motion information list, or $T_1$ pieces of motion information selected from the motion information list according to other predefined rules, which is not limited in the embodiments of the present disclosure.

When the target motion information includes the N pieces of motion information, in an example implementation, duplicate-checking comparison is performed between the candidate motion information and the N pieces of motion information one by one sequentially in an order from the first piece of motion information to the $N^{th}$ piece of motion information; in another implementation, duplicate-checking comparison is performed between the candidate motion information and the N pieces of motion information one by one sequentially in an order from the $N^{th}$ piece of motion information to the first piece of motion information. In some implementations, an order of performing duplicate-checking comparison may also be determined according to other predefined rules, which is not limited in the embodiments of the present disclosure.

When the target motion information includes the $T_1$ pieces of motion information, the $T_1$ pieces of motion information may include the first piece of motion information to the $T_1^{th}$ piece of motion information in the motion information list, or the $N^{th}$ piece of motion information to the $(N-T_1+1)^{th}$ piece of motion information in the motion information list.

When the $T_1$ pieces of motion information include the first piece of motion information to the $T_1^{th}$ piece of motion information in the motion information list, duplicate-checking comparison is performed between the candidate motion information and the $T_1$ pieces of motion information one by one sequentially in an order from the first piece of motion information to the $T_1^{th}$ piece of motion information; or duplicate-checking comparison is performed between the candidate motion information and the $T_1$ pieces of motion information one by one sequentially in an order from the $T_1^{th}$ piece of motion information to the first piece of motion information. If the $T_1$ pieces of motion information include motion information from the $N^{th}$ piece of motion information to the $(N-T_1+1)^{th}$ piece of motion information in the motion information list, duplicate-checking comparison is performed between the candidate motion information and the $T_1$ pieces of motion information one by one sequentially in an order from the $N^{th}$ piece of motion information to the $(N-T_1+1)^{th}$ piece of motion information; or duplicate-checking comparison is performed between the candidate motion information and the $T_1$ pieces of motion information one by one sequentially in an order from the $(N-T_1+1)^{th}$ piece of motion information to the $N^{th}$ piece of motion information. In some implementations, an order of performing duplicate-checking comparison may also be determined according to other predefined rules, which is not limited in the embodiments of the present disclosure.

In summary, in the embodiments of the present disclosure, the above-mentioned implementations are provided, to implement determining, according to the length of the motion information list, the target motion information in the motion information list that needs to be compared with the candidate motion information for duplicate checking, thereby improving the flexibility and diversity of the solution.

In an exemplary embodiment, a candidate class list in which the motion information list is in the IBC mode is used as an example, to introduce and explain a construction process of the candidate class list. The candidate class list is used for recording motion information corresponding to a code unit. The motion information includes the first items in or combinations of the first items and at least one other item in a BV, position information, size information, and repeat count information. Certainly, with evolution of technology, content included in the motion information may also change, which is not limited in the embodiments of the present disclosure. In addition, the above-mentioned position information includes an abscissa and an ordinate of an upper left corner of an IBC coded block, the size information includes a width and a height of the IBC coded block, and the repeat count information includes an appearance frequency of a BV of the IBC coded block in HBVP.

It is assumed that a candidate BV is denoted as $C=\{c_0, c_1, \ldots, c_m\}$, and a candidate class list is denoted as $L=\{l_0, l_1, \ldots, l_n\}$, where m and n are both integers. A process for constructing the candidate class list is as follows:

1) Initialize a length N of a candidate class list L to 0, a maximum length of L being $N_{max}$.
2) According to an order of $c_0, c_1, \ldots, c_m$, determine whether to insert $c_x$ ($0 \leq x \leq m$) into the candidate class list L according to the following method:
   2-1) If the length of the candidate class list L is 0, directly insert $c_x$ into L.
   2-2) If the length of the candidate class list L is not 0, obtain a value of a repeat indicator (denoted as flag) according to one method of 3) or 4).
      a) If a value of flag is 0, and the length N of L is less than $N_{max}$, insert $c_x$ into L.
      b) If the value of flag is 0, and the length N of L is equal to $N_{max}$, there are two example methods as follows:
         b-1) End construction of the candidate class list L, and skip inserting $c_x$ into L.
         b-2) Remove, according to the first-in, first-out principle, a BV first inserted into L, and then insert $c_x$ into L.
      c) If the value of flag is 1, there are two example methods as follows:
         c-1) Skip inserting $c_x$ into L.
         c-2) Remove a duplicate BV from L, decrease the length N of L by 1, and then insert $c_x$ into L.
   In addition, in 1) and 2) above, there are two methods to insert $c_x$ into L:
   Method 1: Insert $c_x$ into a tail of L, and increase the length N of L by 1;
   Method 2: Insert $c_x$ into a head of L, and increase the length N of L by 1.
3) Initialize a value of flag to 0, and check whether there is a BV duplicate with $c_x$ in L according to the following method, where if there is a duplicate BV, the value of flag is 1, and otherwise, the value of flag is 0:
   3-1) Set a threshold $T_1$, the length of L being N:
      a) If $N \leq T_1$, check whether $c_x$ is duplicate with $l_0, l_1, \ldots, l_{N-1}$.
      b) If $N > T_1$, check whether $c_x$ is duplicate with $l_0, l_1, \ldots, l_{T1-1}$.
   3-2) Set a threshold $T_2$, the length of L being N:
      a) If $N \leq T_2$, check whether $c_x$ is duplicate with $l_0, l_1, \ldots, l_{N-1}$.
      b) If $N > T_2$, skip duplicate checking, where the value of flag is 0.
   3-3) Set thresholds $T_1$ and $T_2$, $T_1 < T_2$, the length of L being N:
      a) If $N \leq T_1$, check whether $c_x$ is duplicate with $l_0, l_1, \ldots, l_{N-1}$;
      b) If $N > T_1$ and $N \leq T_2$, check whether $c_x$ is duplicate with $l_0, l_1, \ldots, l_{T1-1}$;
      c) If $N > T_2$, skip duplicate checking, where the value of flag is 0.
4) Initialize the value of flag to 0, and check whether there is a BV duplicate with $c_x$ in L according to the following method, where if there is a duplicate BV, the value of flag is 1, and otherwise, the value of flag is 0:
   3-1) Set a threshold $T_1$, the length of L being N:
      a) If $N \leq T_1$, check whether $c_x$ is duplicate with $l_{N-1}, l_{N-2}, \ldots, l_0$.
      a) If $N > T_1$, check whether $c_x$ is duplicate with $l_{N-1}, l_{N-2}, \ldots, l_{N-T1}$.
   3-2) Set a threshold $T_2$, the length of L being N:
      a) If $N \leq T_2$, check whether $c_x$ is duplicate with $l_{N-1}, l_{N-2}, \ldots, l_0$.
      b) If $N > T_2$, skip duplicate checking, where the value of flag is 0.
   3-3) Set thresholds $T_1$ and $T_2$, $T_1 < T_2$, the length of L being N:

a) If $N \leq T_1$, check whether $c_x$ is duplicate with $l_{N-1}$, $l_{N-2}, \ldots l_0$.
b) If $N > T_1$ and $N \leq T_2$, check whether $c_x$ is duplicate with $l_{N-1}, l_{N-2}, \ldots l_{N-T1}$.
c) If $N > T_2$, skip duplicate checking, where the value of flag is 0.

In the above-mentioned 3) and 4), there are two methods to determine whether $c_x$ is duplicate with $l_n$:

Method 1: Both an abscissa and an ordinate of $c_x$ are equal to those of $l_n$.

Manner 2: Both an absolute value of an abscissa difference between $c_x$ and $l_n$ and an absolute value of an ordinate difference between $c_x$ and $l_n$ are smaller than a preset threshold D.

Based on construction of a candidate class list in AVS3, the following are some specific embodiments in the technical solutions of the present disclosure:

It is assumed that $c_0, c_1, \ldots, c_6$ are BVs derived from various classes in a construction process of the candidate class list in AVS3, where $c_x$ is a BV derived from a category x, and the BVs are needed to construct the candidate class list L.

In an embodiment, it is assumed that $c_0, c_1, \ldots, c_6$ are all present, $c_0$ is duplicate with $c_6$, and $T_1=1$.

The process for constructing L is as follows:
1. If a current to-be-inserted BV is $c_0$: a length N of L is 0, directly insert $c_0$ into L, that is, let $l_0=c_0$ and N=1.
2. If the current to-be-inserted BV is $c_1$: the length N of L is 1, since $N \leq T_1$, check whether $c_1$ is duplicate with $l_0$. If a result indicates that $c_1$ is not duplicate with $l_0$, let $l_1=c_1$ and N=2.
3. If the current to-be-inserted BV is $c_2$: the length N of L is 2, since $N > T_1$, check whether $c_2$ is duplicate with $l_0$. If a result indicates that $c_2$ is not duplicate with $l_0$, let $l_2=c_2$ and N=3.
4. Insert $c_3$, $c_4$ and $c_5$ into L using a method similar to the above-mentioned method, where N=6.
5. If the current to-be-inserted BV is $c_6$: the length N of L is 6, since $N > T_1$, check whether $c_6$ is duplicate with $l_0$. If a result indicates that $c_6$ is duplicate with $l_0$, skip inserting $c_6$, where N=6.

In another embodiment, it is assumed that there are $c_0, c_1, \ldots, c_6$, where $T_1=2$ and $T_2=4$.

The process for constructing L is as follows:
1. A current to-be-inserted BV is $c_0$: A length N of L is 0. Directly insert $c_0$ into L, that is, let $l_0=c_0$ and N=1.
2. The current to-be-inserted BV is $c_1$: The length N of L is 1. Since $N \leq T_1$, check whether $c_1$ is duplicate with $l_0$. If a result indicates that $c_1$ is not duplicate with $l_0$, let $l_1=c_1$ and N=2.
3. The current to-be-inserted BV is $c_2$: The length N of L is 2. Since $N \leq T_1$, check whether $c_2$ is duplicate with $l_0$ or $l_1$. If a result indicates that $c_2$ is duplicate with neither of $l_0$ and $l_1$, let $l_2=c_2$ and N=3.
4. The current to-be-inserted BV is $c_3$: The length N of L is 3. Since $T_1 < N \leq T_2$, check whether $c_3$ is duplicate with $l_0$ or $l_1$. If a result indicates that $c_3$ is duplicate with neither of $l_0$ and $l_1$, let $l_3=c_3$ and N=4.
5. The current to-be-inserted BV is $c_4$: The length N of L is 4. Since $T_1 < N \leq T_2$, check whether $c_4$ is duplicate with $l_0$ or $l_1$. If a result indicates that $c_4$ is duplicate with neither of $l_0$ and $l_1$, let $l_4=c_4$ and N=5.
6. The current to-be-inserted BV is $c_5$: The length N of L is 5. Since $N > T_2$, skip duplicate checking, and directly let $l_5=c_5$ and N=6.
7. The current to-be-inserted BV is $c_6$: The length N of L is 6. Since $N > T_2$, skip duplicate checking, and directly let $l_6=c_6$ and N=7.

In another embodiment, it is assumed that $c_0, c_1, \ldots, c_6$ are all present, $c_0$ is duplicate with $c_1$ and $c_6$, $T_1$ is set to a quantity such that $c_0$ and $c_1$ are present but are not duplicate with each other, $T_1=1$, and $T_2=4$.

The process for constructing L is as follows:
1. A current to-be-inserted BV is $c_0$: A length N of L is 0. Directly insert $c_0$ into L, that is, let $l_0=c_0$ and N=1.
2. The current to-be-inserted BV is $c_1$: The length N of L is 1. Since $N \leq T_1$, check whether $c_1$ is duplicate with $l_0$. If a result indicates that $c_1$ is duplicate with $l_0$, skip inserting $c_1$, where N=1.
3. The current to-be-inserted BV is $c_2$: The length N of L is 1. Since $N \leq T_1$, check whether $c_2$ is duplicate with $l_0$. If a result indicates that $c_2$ is not duplicate with $l_0$, let $l_1=c_2$ and N=2.
4. The current to-be-inserted BV is $c_3$: The length N of L is 2. Since $T_1 < N \leq T_2$, check whether $c_3$ is duplicate with $l_0$. If a result indicates that $c_3$ is not duplicate with $l_0$, let $l_2=c_3$ and N=3.
5. The current to-be-inserted BV is $c_4$: The length N of L is 3. Since $T_1 < N \leq T_2$, check whether $c_4$ is duplicate with $l_0$. If a result indicates that $c_4$ is not duplicate with $l_0$, let $l_3=c_4$ and N=4.
6. The current to-be-inserted BV is $c_5$: The length N of L is 4. Since $T_1 < N \leq T_2$, check whether $c_5$ is duplicate with $l_0$. If a result indicates that $c_5$ is not duplicate with $l_0$, let $l_4=c_5$ and N=5.
7. The current to-be-inserted BV is $c_6$: The length N of L is 5. Since $N > T_2$, skip duplicate checking, and directly let $l_5=c_6$ and N=6.

The following describes apparatus embodiments of the present disclosure, which can be used for executing the method embodiments of the present disclosure. For details not disclosed in the apparatus embodiments of the present disclosure, refer to the method embodiments of the present disclosure.

Figure 7:
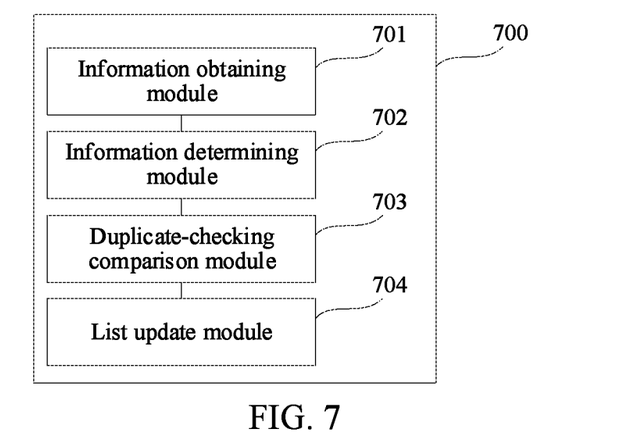
FIG. 7 is a block diagram of an apparatus for constructing a motion information list in video encoding and decoding according to an embodiment of the present disclosure.

FIG. 7 is a block diagram of an apparatus for constructing a vector list in video encoding and decoding according to an embodiment of the present disclosure. The apparatus has functions of implementing the above-mentioned method embodiments. The functions may be implemented by hardware, or may be implemented by hardware executing corresponding software. The apparatus may be a computer device mentioned above or may be disposed in a computer device. An apparatus 700 may include: an information obtaining module 701, an information determining module 702, a duplicate-checking comparison module 703, and a list update module 704.

The information obtaining module 701 is configured to obtain candidate motion information and a length of a motion information list, the length of the motion information list being represented by a quantity of pieces of motion information included in the motion information list.

The information determining module 702 is configured to determine, according to the length of the motion information list, target motion information in the motion information list that needs to be compared with the candidate motion information for duplicate checking.

The duplicate-checking comparison module 703 is configured to perform duplicate-checking comparison between the candidate motion information and the target motion information.

The list update module 704 is configured to update the motion information list according to a duplicate-checking comparison result.

In summary, in the technical solutions provided in the embodiments of the present disclosure, target motion information in a motion information list that needs to be compared with to-be-inserted candidate motion information for duplicate checking is determined by obtaining a length of the motion information list. Duplicate-checking comparison is performed between the candidate motion information and the target motion information, so that some pieces of motion information are selectively selected from the motion information list for duplicate-checking comparison instead of performing complete duplicate-checking comparison on all pieces of motion information in the motion information list every time, which helps decrease a quantity of duplicate checking operations, thereby reducing the complexity of a video codec.

In an exemplary embodiment, the information determining module 702 is configured to:

determine, when a length N of the motion information list is less than or equal to a first threshold $T_1$, that the target motion information includes all N pieces of motion information in the motion information list; and determine, when the length N of the motion information list is greater than the first threshold $T_1$, that the target motion information includes $T_1$ pieces of motion information in the motion information list.

In an exemplary embodiment, the information determining module 702 is configured to:

determine, when a length N of the motion information list is less than or equal to a second threshold $T_2$, that the target motion information includes all N pieces of motion information in the motion information list.

skip, when the length N of the motion information list is greater than the second threshold $T_2$, duplicate-checking comparison, and determine that the duplicate-checking comparison result is that there is no duplication.

In an exemplary embodiment, the information determining module 702 is configured to:

determine, when a length N of the motion information list is less than or equal to a first threshold $T_1$, that the target motion information includes all N pieces of motion information in the motion information list; and determine, when the length N of the motion information list is greater than the first threshold $T_1$ and is less than or equal to a second threshold $T_2$, that the target motion information includes $T_1$ pieces of motion information in the motion information list; and skip, when the length N of the motion information list is greater than the second threshold $T_2$, duplicate-checking comparison, and determine that the duplicate-checking comparison result is that there is no duplication.

The first threshold $T_1$ is less than the second threshold $T_2$.

In an exemplary embodiment, the duplicate-checking comparison module 703 is configured to:

perform duplicate-checking comparison between the candidate motion information and the N pieces of motion information one by one sequentially in an order from the first piece of motion information to the $N^{th}$ piece of motion information when the target motion information includes the N pieces of motion information; or performing duplicate-checking comparison between the candidate motion information and the N pieces of motion information one by one sequentially in an order from the $N^{th}$ piece of motion information to the first piece of motion information when the target motion information includes the N pieces of motion information;

In an exemplary embodiment, the $T_1$ pieces of motion information include: the first piece of motion information to the $T_1^{th}$ piece of motion information in the motion information list, or the $N^{th}$ piece of motion information to $(N-T_1+1)^{th}$ piece of motion information in the motion information list.

In an exemplary embodiment, the duplicate-checking comparison module 703 is configured to:

perform duplicate-checking comparison between the candidate motion information and the T1 pieces of motion information one by one sequentially in an order from the first piece of motion information to the $T_1^{th}$ piece of motion information when the T1 pieces of motion information include the first piece of motion information to the $T_1^{th}$ piece of motion information in the motion information list; or perform duplicate-checking comparison between the candidate motion information and the $T_1$ pieces of motion information one by one sequentially in an order from the $T_1^{th}$ piece of motion information to the first piece of motion information when the $T_1$ pieces of motion information include the first piece of motion information to the $T_1^{th}$ piece of motion information in the motion information list.

perform duplicate-checking comparison between the candidate motion information and the $T_1$ pieces of motion information one by one sequentially in an order from the $N^{th}$ piece of motion information to the $(N-T_1+1)^{th}$ piece of motion information when the T1 pieces of motion information include the $N^{th}$ piece of motion information to the $(N-T_1+1)^{th}$ piece of motion information in the motion information list;

perform duplicate-checking comparison between the candidate motion information and the T1 pieces of motion information one by one sequentially in an order from the $(N-T_1+1)^{th}$ piece of motion information to the $N^{th}$ piece of motion information when the T1 pieces of motion information include the $N^{th}$ piece of motion information to the $(N-T_1+1)^{th}$ piece of motion information in the motion information list.

In an exemplary embodiment, the list update module 704 is configured to:

insert the candidate motion information into the motion information list when the duplicate-checking comparison result is that there is no duplication, and the length of the motion information list is less than a maximum length; or end construction of the motion information list and skipping inserting the candidate motion information into the motion information list, or removing motion information first inserted into the motion information list according to the first-in, first-out principle and inserting the candidate motion information into the motion information list when the duplicate-checking comparison result is that there is no duplication, and the length of the motion information list is equal to a maximum length; and skipping inserting the candidate motion information into the motion information list, or removing motion information duplicate with the candidate motion information from the motion information list and inserting the candidate motion information into the motion information list when the duplicate-checking comparison result is that there is duplication.

In an exemplary embodiment, the inserting the candidate motion information into the motion information list includes: inserting the candidate motion information into a tail of the motion information list; or inserting the candidate motion information into a head of the motion information list.

In an exemplary embodiment, that the candidate motion information is duplicate with the motion information in the motion information list means that both an abscissa and an ordinate of a vector value included in the candidate motion information are equal to those of a vector value included in the motion information; or both an absolute value of an abscissa difference and an absolute value of an ordinate difference between a vector value included in the candidate motion information and a vector value included in the motion information are smaller than preset thresholds.

In an exemplary embodiment, the list update module 704 is further configured to insert, after the length of the motion information list is obtained, the candidate motion information into the motion information list directly when the length of the motion information list is 0.

The information determining module 702 is further configured to start, when the length of the motion information list is not 0, execution from the operation of determining, according to the length of the motion information list, target motion information in the motion information list that needs to be compared with the candidate motion information for duplicate checking.

In an exemplary embodiment, the motion information list is a candidate class list in an IBC mode, the candidate class list being used for recording motion information corresponding to a code unit, the motion information including the first items in or combinations of the first items and at least one other item in a BV, position information, size information, and repeat count information.

When the apparatus provided in the above-mentioned embodiments implements functions of the apparatus, it is illustrated with an example of division of each functional module. In the practical application, the function distribution may be finished by different functional modules according to the requirements, that is, the internal structure of the device is divided into different functional modules, to implement all or some of the functions described above. In addition, the apparatus and method embodiments provided in the above-mentioned embodiments belong to the same concept. For the specific implementation process, reference may be made to the method embodiments, and details are not described herein again.

Figure 8:
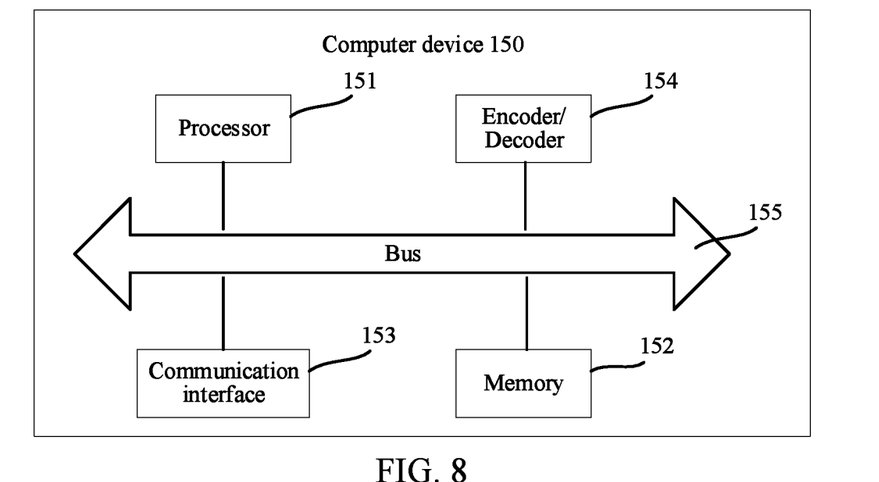
FIG. 8 is a structural block diagram of a computer device according to an embodiment of the present disclosure.

FIG. 8 is a structural block diagram of a computer device according to an embodiment of the present disclosure. The computer device may be the encoder side device described above or the decoder side device described above. A computer device 150 may include: a processor 151, a memory 152, a communication interface 153, an encoder/decoder 154, and a bus 155.

The processor 151 includes one or more processing cores. The processor 151 runs a software program and a module to execute various functional applications and perform information processing.

The memory 152 may be used for storing a computer program, and the processor 151 is used for executing the computer program to implement the above-mentioned methods for constructing a motion information list in video encoding and decoding.

The communication interface 153 may be configured to communicate with other devices, such as receiving audio and video data.

The encoder/decoder 154 can be used for implementing encoding and decoding functions, such as encoding and decoding audio and video data.

The memory 152 is connected to the processor 151 by the bus 155.

The memory 152 may be implemented by any type of a volatile or nonvolatile storage device or a combination thereof. The volatile or nonvolatile storage device includes but is not limited to a magnetic disk or an optical disc, an EEPROM (Electrically Erasable Programmable Read-Only Memory), an EPROM (Erasable Programmable Read-Only Memory), a SRAM (Static Random-Access Memory), a ROM (Read-Only Memory), a magnetic memory, a flash memory, a PROM (Programmable read-only memory).

A person skilled in the art may understand that the structure shown in FIG. 8 does not constitute any limitation on the computer device 150, and the computer device may include more components or fewer components than those shown in the figure, or some components may be combined, or a different component deployment may be used.

In an exemplary embodiment, a computer-readable storage medium is further provided. The computer-readable storage medium stores at least one instruction, at least one program, a code set, or an instruction set, the at least one instruction, the at least one program, the code set, or the instruction set being executed by a processor to implement the method for constructing a motion information list in video encoding and decoding described above.

In an exemplary embodiment, a computer program product is further provided. The computer program product, when executed by a processor, is used for implementing the method for constructing a motion information list in video encoding and decoding described above.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The above-mentioned descriptions are merely examples of the embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A method for constructing a motion information list in video encoding and decoding, the method comprising:
    obtaining candidate motion information and a length of the motion information list,
        wherein the length of the motion information list is a quantity of pieces of motion information included in the motion information list;
    determining a target motion information list from among the pieces of motion information included in the motion information list,
        wherein the target motion information list is a sub-set of the motion information list,
        wherein the target motion information list comprises the pieces of motion information to be checked for duplicates of the candidate motion information, and
        wherein the target motion information list comprises a first number of pieces of motion information from the motion information list based on whether the length of the motion information list is less than a first threshold $T_1$ and whether the length of the motion information list is less than a second threshold $T_2$;

updating a first flag based on a result of duplicate-checking comparison among the target motion information list and the candidate motion information,
wherein the first flag indicates whether a duplicate piece of motion information is present in the motion information list; and
updating the motion information list according to the result of the duplicate-checking comparison.

2. The method according to claim 1, wherein the determining comprises:
determining, based on a length N of the motion information list being less than or equal to the first threshold $T_1$ and being less than or equal to the second threshold $T_2$, that the target motion information list comprises all N pieces of motion information in the motion information list.

3. The method according to claim 1, wherein the determining comprises:
determining that the result of the duplicate-checking comparison is that there is no duplication based on a length N of the motion information list being greater than the second threshold $T_2$, and updating the first flag to 0.

4. The method according to claim 1, wherein the determining comprises:
determining, based on a length N of the motion information list being greater than the first threshold $T_1$ and being less than or equal to the second threshold $T_2$, that the target motion information list comprises $T_1$ pieces of motion information in the motion information list; or
determining that the result of the duplicate-checking comparison is that there is no duplication based on the length N of the motion information list being greater than the second threshold $T_2$, and updating the first flag to 0, the first threshold $T_1$ being less than the second threshold $T_2$.

5. The method according to claim 2, wherein the duplicate-checking comparison comprises:
comparing the candidate motion information and the first number of pieces of motion information in the target motion information list one by one sequentially in an order from a first piece of motion information to a last piece of motion information in the target motion information list; or
comparing the candidate motion information and the first number of pieces of motion information in the target motion information list one by one sequentially in an order from the last piece of motion information in the target motion information list to the first piece of motion information in the target motion information list.

6. The method according to claim 4, wherein the $T_1$ pieces of motion information comprise: a first piece of motion information to a $T_1^{th}$ piece of motion information in the motion information list, or a $N^{th}$ piece of motion information to a $(N-T_1+1)^{th}$ piece of motion information in the motion information list.

7. The method according to claim 6, wherein the duplicate-checking comparison comprises:
comparing the candidate motion information and the $T_1$ pieces of motion information one by one sequentially in an order from the first piece of motion information in the target motion information list to a $T_1^{th}$ piece of motion information in the target motion information list; or
comparing the candidate motion information and the $T_1$ pieces of motion information one by one sequentially in an order from the $T_1^{th}$ piece of motion information in the target motion information list to the first piece of motion information in the target motion information list.

8. The method according to claim 6, wherein the forming the duplicate-checking comparison comprises:
comparing the candidate motion information and the $T_1$ pieces of motion information one by one sequentially in an order from the $N^{th}$ piece of motion information to a $(N-T_1+1)^{th}$ piece of motion information based on the $T_1$ pieces of motion information in the target motion information list comprising the $N^{th}$ piece of motion information in the motion information list to the $(N-T_1+1)^{th}$ piece of motion information in the motion information list; or
comparing the candidate motion information and the $T_1$ pieces of motion information one by one sequentially in an order from the $(N-T_1+1)^{th}$ piece of motion information to the $N^{th}$ piece of motion information based on the $T_1$ pieces of motion information in the target motion information list comprising the $N^{th}$ piece of motion information in the motion information list to the $(N-T_1+1)^{th}$ piece of motion information in the motion information list.

9. The method according to claim 1, wherein the updating the motion information list comprises:
inserting the candidate motion information into the motion information list based on the first flag indicating that there is no duplication, and the length of the motion information list is less than a maximum length.

10. The method according to claim 1, wherein the updating the motion information list comprises:
ending construction of the motion information list and skipping inserting the candidate motion information into the motion information list, or
removing motion information first inserted into the motion information list according to a first-in, first-out principle and inserting the candidate motion information into the motion information list based on the first flag indicating that there is no duplication, and the length of the motion information list is equal to a maximum length.

11. The method according to claim 1, wherein the updating the motion information list comprises:
skipping inserting the candidate motion information into the motion information list, or
removing motion information duplicate with the candidate motion information from the motion information list and inserting the candidate motion information into the motion information list based on the first flag indicating that there is duplication.

12. The method according to claim 9, wherein the inserting comprises:
inserting the candidate motion information into a tail of the motion information list; or
inserting the candidate motion information into a head of the motion information list.

13. The method according to claim 1, wherein the duplicate-checking comparison comprises: determining that the candidate motion information is duplicate with a piece of motion information in the motion information list based on an abscissa and an ordinate of a vector value included in the candidate motion information being equal to those of a vector value included in the piece of motion information.

14. The method according to claim 1, wherein the duplicate-checking comparison comprises: determining that the candidate motion information is duplicate with a piece of motion information in the motion information list based on an absolute value of an abscissa difference and an absolute value of an ordinate difference between a vector value included in the candidate motion information and a vector value include in the piece of motion information being smaller than preset thresholds.

15. The method according to claim 1, wherein subsequent to the obtaining the length of the motion information list, the method further comprises:
   inserting the candidate motion information into the motion information list directly based on the length of the motion information list being 0; and
   starting the target motion information list in the motion information list based on the length of the motion information list being other than 0.

16. The method according to claim 1, wherein the motion information list is a candidate class list in an intra block copy (IBC) mode, the candidate class list being used for recording motion information corresponding to a code unit, the motion information comprising a first items in or combinations of the first items and at least one other item in a block vector (BV), position information, size information, and repeat count information.

17. An apparatus for constructing a motion information list in video decoding, the apparatus comprising:
   at least one memory configured to store program code; and
   at least one processor configured to read the program code and operate as instructed by the program code, the program code comprising:
      first information obtaining code configured to cause the at least one processor to obtain candidate motion information and a length of the motion information list,
         wherein the length of the motion information list is a quantity of pieces of motion information included in the motion information list;
      second information determining code configured to cause the at least one processor to determine a target motion information list from among the pieces of motion information included in the motion information list,
         wherein the target motion information list is a sub-set of the motion information list,
         wherein the target motion information list comprises the pieces of motion information to be checked for duplicates of the candidate motion information, and
         wherein the target motion information list comprises a first number of pieces of motion information from the motion information list based on whether the length of the motion information list is less than a first threshold T; and whether the length of the motion information list is less than a second threshold $T_2$;
      duplicate checking code configured to cause the at least one processor to update a first flag based on a result of duplicate-checking comparison among the target motion information list and the candidate motion information,
         wherein the first flag indicates whether a duplicate piece of motion information is present in the motion information list; and
      list updating code configured to cause the at least one processor to update the motion information list according to the result of the duplicate-checking comparison.

18. The apparatus of claim 17, wherein the second information determining code is further configured to cause the at least one processor to:
   determine, based on a length N of the motion information list being greater than the first threshold $T_1$ and being less than or equal to the second threshold $T_2$, that the target motion information list comprises $T_1$ pieces of motion information in the motion information list; and
   determine that the result of the duplicate-checking comparison is that there is no duplication based on the length N of the motion information list being greater than the second threshold $T_2$, and updating the first flag to 0, wherein the first threshold $T_1$ is less than the second threshold $T_2$.

19. The apparatus of claim 18, wherein the duplicate checking code is further configured to cause the at least one processor to:
   comparing the candidate motion information and the first number of pieces of motion information in the target motion information list one by one sequentially in an order from a first piece of motion information to a last piece of motion information in the target motion information list;
   comparing the candidate motion information and the first number of pieces of motion information in the target motion information list one by one sequentially in an order from the last piece of motion information in the target motion information list to the first piece of motion information in the target motion information list.

20. A non-transitory computer-readable storage medium, storing at least one program, the at least one program configured to cause at least one processor to:
   obtain candidate motion information and a length of a motion information list,
      wherein the length of the motion information list is a quantity of pieces of motion information included in the motion information list;
   determine a target motion information list from among the pieces of motion information included in the motion information list,
      wherein the target motion information list is a sub-set of the motion information list,
      wherein the target motion information list the comprises pieces of motion information to be checked for duplicates of the candidate motion information, and
      wherein the target motion information list comprises a first number of pieces of motion information from the motion information list based on whether the length of the motion information list is less than a first threshold $T_1$ and whether the length of the motion information list is less than a second threshold $T_2$;
   update a first flag based on a result of duplicate-checking comparison among the target motion information list and the candidate motion information; and
   update the motion information list according to the result of the duplicate-checking comparison.

* * * * *